United States Patent [19]

Wiese et al.

[11] Patent Number: 4,846,299
[45] Date of Patent: Jul. 11, 1989

[54] COUPLING ASSEMBLIES

[75] Inventors: Helmut Wiese, Neunkirchen-Seelscheid; Herbert Taureg, Hennef, both of Fed. Rep. of Germany

[73] Assignee: Viscodrive GmbH, Lohmar, Fed. Rep. of Germany

[21] Appl. No.: 145,584

[22] Filed: Jan. 19, 1988

[51] Int. Cl.⁴ .................. F16D 35/00; B60K 17/344
[52] U.S. Cl. ................................. 180/248; 180/249
[58] Field of Search ............... 180/244, 248, 249, 250

[56] References Cited

U.S. PATENT DOCUMENTS

| | | | |
|---|---|---|---|
| 3,760,922 | 9/1973 | Rolt et al. | 180/248 |
| 4,031,780 | 6/1977 | Dolan et al. | 180/248 |
| 4,048,872 | 9/1977 | Webb | 180/248 |
| 4,432,431 | 2/1984 | Russell | 180/248 |
| 4,605,087 | 8/1986 | Ashauer et al. | 180/240 |

Primary Examiner—Kenneth R. Rice
Attorney, Agent, or Firm—Toren, McGeady & Associates

[57] ABSTRACT

The invention relates to a coupling assembly which is controllable to vary the amount of torque transmitted by the assembly. The latter comprises a housing (2, 70) and hub carrying sets (12, 26, 97, 98, 99) of interleaved plates, the housing being filled with a viscous liquid. Means (4, 29; 23, 24, 25, 51) externally of the housing is provided rapidly and repeatedly to increase and decrease pressure applied to the liquid in the housing. Application of such pressure causes the plates of the two sets to come into contact and release of the pressure allows the plates to move apart.

19 Claims, 6 Drawing Sheets

COUPLING ASSEMBLIES

BACKGROUND TO THE INVENTION

1. Field of the Invention

This invention relates to coupling assemblies which are controllable to vary the amount of torque transmitted by the assembly. Such assemblies find particular, but not exclusive, use in the drive transmissions of motor vehicles.

2. Description of the Prior Art

A viscous shear coupling, as described for example in United Kingdom Patent Specification No. 1,357,106 (and corresponding U.S. Pat. Ser. No. 3,760,922 issued 25 Sept. 1973) comprises a housing part, a hub part within the housing part, the parts being relatively rotatable about a common axis, and two sets of interleaved plates. The plates of one the sets are rotatable with the housing and the plates of the other set are rotatable with the hub. The plates of one of the sets are axially movable into contact with the plates of the other set. The housing contains a viscous liquid such, for example, as a silicone oil.

Normally torque is transmitted between the housing part and the hub part due to shearing forces in the viscous liquid between adjacent plates, i.e. in viscous mode. The above patent specifications describe that the housing part may be filled with viscous liquid to a fill factor which leaves part of the housing normally filled with air or gas.

Such couplings exhibit a phenomenon which has come to be known as the "hump" made in which the plates of the two sets come into contact and torque is transmitted by metallic friction and/or mixed friction between the plates.

Prolonged slipping of the coupling in "viscous mode" causes heating and expansion of the silicone oil. When the oil has expanded to fill the entire space within the coupling there is a sharp increase in pressure in the coupling and, due to the throttling effect between adjacent plates, the plates of one set are moved into contact with the plates of the other set by the fluid pressure in the coupling.

The onset of the hump mode is therefore dependent upon a temperature rise in the coupling producing a pressure increase therein. The decay of pressure in the coupling is slow with decrease in temperature and therefore separation of the plates after being in the hump mode will take some time.

There have been various proposals to vary the torque-transmitting characteristics of viscous couplings by varying the fill factor and/or by varying the spacing between the plates of the two sets when the coupling is in use. These proposals have only succeeded in varying the torque transmitting characteristics of the coupling within narrow limits and do not enable the torque transmitting capability of the coupling to be significantly increased or decreased at will.

A particular application where it is desirable to be able to control the torque transmission at will is in a so-called viscous transmission of a motor vehicle. In such a transmission, as shown for example in FIG. 17 of the above mentioned patents, one axle of the vehicle is driven directly from the prime mover while the other axle is driven through a viscous coupling only when there is a significant speed difference between the axles. This can provide problems where the front axle of the vehicle is directly driven, the rear axle is driven through the viscous coupling and the front wheels are heavily braked so that there is a considerable speed difference between the front and rear axles. The braking torque will be transmitted through the viscous coupling to the rear wheels and will tend to brake these. If the rear wheels lock lateral stability of the vehicle is impaired. If the vehicle is fitted with an anti-lock braking system (hereinafter called an ABS system) then transfer of braking torque from the front wheels to the rear wheels will prevent proper operation of the system. It would be desirable, therefore, in such configurations to be able substantially to disable the viscous coupling but with present technology this is not possible and therefore one-way clutches have been proposed for this purpose, see for example U.S. Pat. No. 4,605,087 issued Aug. 12, 1986.

SUMMARY OF THE INVENTION

It is one object of the present invention to provide a coupling assembly using the so called hump made referred to above and in which the torque transmitted by the coupling can be controllably varied within wide limits.

It is another object of the invention to provide a motor vehicle in which one axle is driven directly from a prime mover and the other axle is driven via a coupling assembly embodying the invention.

According to one aspect of the invention, therefore, we provide a coupling assembly comprising a housing part, a hub part within the housing part and extending therefrom in sealed relation thereto, two sets of interleaved annular plates in the housing, the plates of one of said sets being rotatable with the housing and the plates of the other set being rotatable with the hub, the plates of at least one of the sets being independently and axially movable with respect to the part with which they are rotatable so as to be capable of coming into contact with the plates of the other set, a viscous liquid completely filling the housing part, aperture means communicating with the interior of the housing part and control means external of the housing and connected to the aperture means for applying pressure to the liquid in the housing, the control means being selectively and repeatedly operable to cause rapid increases and decreases in such applied pressure.

With a coupling assembly of the invention, when the pressure within the coupling is low, for example, atmospheric, any torque transmitted between the parts will be by viscous shear. By choosing the viscosity of the viscous liquid the torque transmitted may be determined but will normally be of a low value. Upon increasing the pressure in the coupling the plates of the two sets are forced into contact in the hump mode by the pressure in the coupling and the torque transmitted will depend, in a given coupling, on the pressure in the coupling and the speed difference between the plates. When it is desired to decrease the torque transmitted all that is necessary is to release the pressure in the coupling. It will be appreciated that whether the plates are in contact or not depends solely on the pressure within the coupling and that this pressure can be rapidly and accurately controlled.

It follows that a coupling assembly embodying the invention can be installed in a vehicle in which one axle is driven through the coupling assembly as described above and in which the pressure in the coupling is released or reduced when the braking system is operated to prevent, for example, rear wheel locking with consequent loss in lateral stability or interference with the operation of an ABS system if fitted.

One way of controlling the pressure within the coupling is to construct the control means as a cylinder connected to the aperture means and full of liquid, a piston being movable axially of the cylinder by operating means so as to increase and decrease the pressure applied to the liquid in the cylinder and the housing part at will.

Preferably the piston is spring-urged to a rest position in which the liquid in the cylinder and thus in the housing is exposed to a low pressure. Conveniently this low pressure is atmospheric or substantially atmospheric pressure.

The assembly may include a tank containing the liquid which is exposed to said low pressure e.g. atmospheric pressure, the tank being connected to port means in the cylinder wall, the port means being open when the piston is in its rest position but being closed by the piston when the latter is in an operative position in which it applies pressure to the liquid in the cylinder and the housing, the tank being arranged to maintain the cylinder full of liquid when the port means is open.

The tank provides a reservoir of liquid in the same manner as the tank in a vehicle brake system provides a reservoir of liquid to compensate for any leakage which may occur from the coupling assembly and conveniently to provide the source of low pressure.

The piston may include an annular groove which is connected to the port means when the piston is in its operative position, the groove being connected to the cylinder via a non-return means in the piston which allows liquid in the groove to enter the cylinder when the piston moves from its operative position to its rest position. This arrangement enables the piston to move to its rest position without impediment while keeping the housing and cylinder full of liquid.

In a particularly compact arrangement the cylinder is arranged within the hub part with the longitudinal axis of the cylinder being coincident with said common axis. In such an arrangement there will be a rotary seal between the cylinder and the liquid tank.

The aperture means may open into the housing part generally radially thereof and approximately mid-way between the ends thereof. This arrangement ensures that the initial pressure increase applied by the piston reaches as many of the plate pairs as possible. Alternatively the aperture means may be located so that the pressure is applied in a direction axially of the coupling.

The operating means for the piston may be hydraulic or mechanical, preferably the former.

In another arrangement, the control means for increasing and decreasing the pressure comprises a hydraulic pump to supply liquid under pressure to the housing part and a pressure controller operable to cause said rapid increases and decreases of pressure of the liquid in the housing part.

In one such arrangement the pump continuously circulates viscous liquid through the housing via feed and return lines and the pressure controller includes a variable throttle in the return line. This arrangement is favorable as avoiding any problems of leakage of liquid from the coupling and the variable throttle may be rapidly operated to increase and decrease pressure in the coupling.

In another arrangement, the pressure controller includes a pressure regulator in a feed line between the pump and the housing to control the pressure applied to the liquid in the housing and a control valve operable selectively to connect the housing part to the pressure regulator or the source of low pressure, e.g. atmospheric pressure.

In any of the foregoing arrangements the control means may be arranged to increase the applied pressure from, and reduce it to, substantially atmospheric pressure.

In another aspect, the invention comprises a motor vehicle having a prime mover, front and rear axles, one of said axles being driven directly from the prime mover and the other axle being driven from the prime mover via a coupling assembly embodying the invention, the vehicle including actuating means to actuate the control means to increase and decrease the pressure applied to the liquid in the housing part.

When the coupling assembly is in its low pressure state then said other axle will be substantially disconnected from the prime mover and the vehicle will act as a two-wheel drive vehicle. When pressure is applied to the coupling assembly the other axle will be connected to the prime mover and the vehicle will act as a four-wheel drive vehicle.

In one arrangement the actuating means is operable, at least in part, on demand by the driver of the vehicle.

In another arrangement the coupling assembly is operated, at least in part, in dependence on the speed difference between the two parts of the coupling. That is to say the vehicle acts as a four-wheel drive vehicle when there is a substantial speed difference between front and rear axles but otherwise as a two-wheel drive vehicle.

In this arrangement the applied pressure may be a function of the speed difference between the coupling parts so as to increase torque transmission with increasing speed difference between the axles.

The vehicle may include a braking system, particularly an ABS system, and the actuating means may be arranged to operate on the control means to ensure that said other axle is disconnected from the prime mover upon application of the vehicle's brakes.

BRIEF DESCRIPTION OF THE DRAWINGS

The invention will now be described in detail by way of example with reference to the accompanying drawings in which.

DESCRIPTION OF THE PREFERRED EMBODIMENTS

Figure 1:
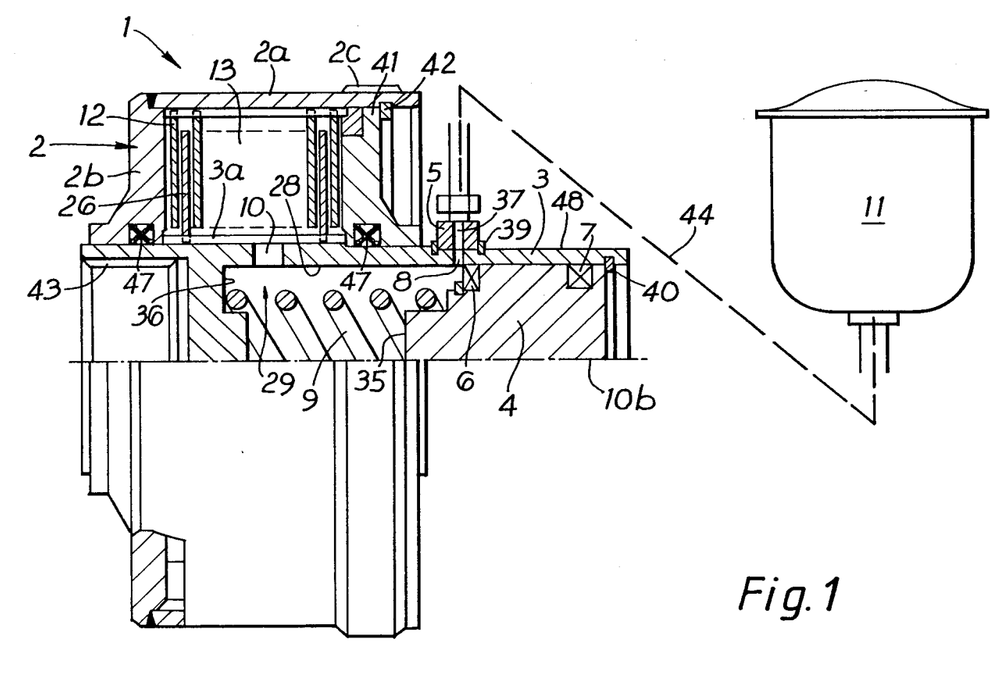
FIG. 1 is a longitudinal section through a coupling assembly constituting a first embodiment of the invention.

Referring now to FIG. 1, the coupling assembly 1 comprises a housing part 2 having an internally splined cylindrical wall 2a with a fixed left-hand end plate 2b welded thereto. A hub part 3 is arranged within the housing, so that the parts are relatively rotatable about a common axis 100, and extends out of the housing to the right in FIG. 1. The right-hand end of the housing is closed by a cover plate 41 which is held in position by a circlip 42. The housing part and hub part are sealed together by seals 47.

A first set of plates 12 is splined to the internal splines of the housing 2. The part of the hub 3 within the housing 2 is externally splined at 3a and a second set of plates 26 is splined to the hub. The plates 12 therefore rotate with the housing and the plates 26 rotate with the hub. The plates 12 and 26 are interleaved and the plates of at least one set, in the example shown the plates 26, are independently axially movable so that they may move into contact with the plates 12.

The whole of the interior of the housing not taken up by the plates is filled with a viscous liquid e.g. a silicone oil.

The hub 3 is formed with a cylindrical bore 28 forming a cylinder 29. A piston 4 is slidable in the cylinder and is sealed thereto by primary and secondary seals 6 and 7. The piston is urged to a rest position shown in FIG. 1, and which is determined by a circlip 40, received in the wall of the cylinder by a spring 9. The spring abuts against a wall 36 at the left-hand end of the cylinder 29.

The cylinder 29 communicates with the interior 13 of the coupling by means of a plurality of apertures, one of which is indicated at 10. The apertures 10 are circumferentially disposed about the hub and are arranged substantially at the mid point of the length of the interior 13.

The hub 3 is also provided with a plurality of ports 8 which constitute port means. As will be seen in FIG. 1 these ports are uncovered when the piston is in its rest position shown in FIG. 1. A collar 5 containing an annular channel 37 engages the external surface 48 of the hub in a sealed manner and is axially located between the shoulder 38 on the hub and a circlip 39. The channel 37 communicates by a pipe 44 with a tank 11 which contains viscous liquid and which is arranged at a height above the coupling so that the cylinder 29 and the interior 13 of the housing are maintained full of viscous liquid by gravity when the piston is in its rest position shown in FIG. 1.

When the piston 4 is moved to the left in FIG. 1, it applies pressure to the liquid in the cylinder 29 and, via the aperture means 10, to the liquid in the interior 13 of the housing. The application of this pressure causes, since the interior 13 is completely full of liquid, the plates 26 to move into engagement with the plates 12, the so called "hump" mode. When there is relative rotation between the housing part 2 and the hub part 3 torque will be transmitted between the parts by metallic and/or mixed friction between the plates 12 and 26. To enable the coupling to be connected to driving and driven parts the hub is provided with an internally splined bore 43 and the housing with external splines 2c.

The torque transmitted by the coupling will depend, inter alia, on the pressure in the interior 13 of the coupling, the greater the pressure, the greater the torque being transmitted.

When it is desired to reduce the transmitted torque the piston 4 is allowed to return to the rest position shown in FIG. 1 and the pressure in the interior 13 of the housing then returns to atmospheric pressure as described above.

Figure 2:
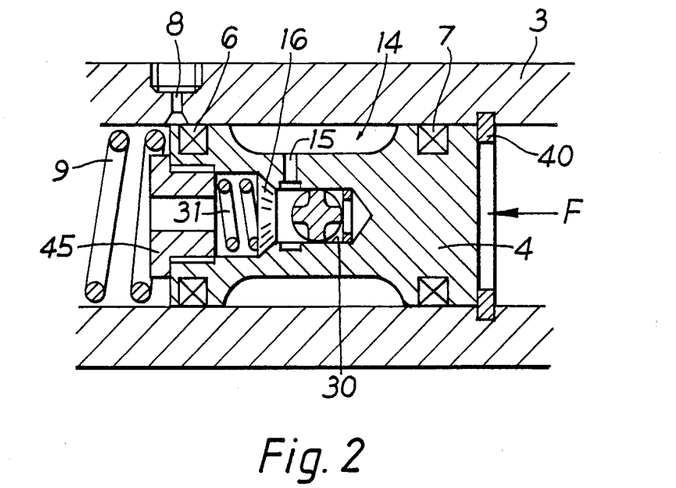
FIGS. 2 and 3 are detail views showing different arrangements of pistons.
Figure 3:
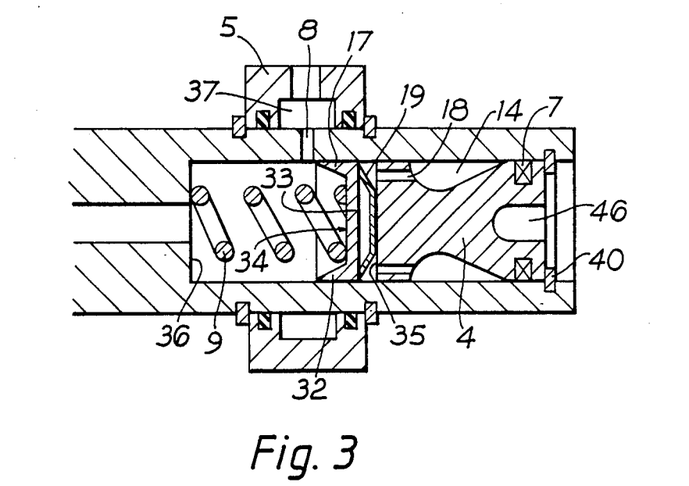

In FIG. 1 the piston 4 is solid and on returning to its rest position from an operative position in which it applies pressure it moves under the action of the spring 9 but may be retarded in its movement due to a partial vacuum being formed to the left of its solid front face 35. The arrangements of FIGS. 2 and 3 are intended to overcome this problem. In each of these figures parts similar to those shown in FIG. 1 are denoted by the same reference numerals.

Referring to FIG. 2, the piston 4 there shown has an annular groove 14 formed therein. This groove 14 communicates via a plurality of radial bores 15 with a longitudinal bore 30 in the piston. The left hand end of this bore is closed by a valve member 16 having a conical head and a stem of star-shaped cross section as shown in FIG. 2 received in the bore 30. The valve member is urged against a seat in a counterbore in the valve body by a spring 31 abutting against a hollow nut 45 screwed into the left hand end of the piston. The size of the nut head is such as to fit within the spring 9.

The annular groove 14 is so located that when the piston 4 is an operative position applying pressure to the liquid in the interior 13 of the housing the groove 14 is in communication with the port means 8 and is therefore filled with liquid from the tank 11. Upon the operating force F on the piston 4 being released, the piston moves to its rest position shown in FIGS. 1 and 2 and the valve 16 lifts off its seat as a result of the partial vacuum to the left of the piston thus allowing liquid in the groove 14 to pass through the bores 15 and via the grooves in the stem of the valve 16 into the cylinder through the aperture in the nut 45 so that there is no impediment to the movement of the piston 4 to its rest position.

FIG. 3 shows an arrangement having a similar effect. In FIG. 3 the piston 4 is provided with a cup washer 17 at its left hand end spaced from the left hand end of the piston by a diaphragm spring 19. The groove 14 communicates by axial passages 18 with a space in which the diaphragm spring 19 is located between the surface 33 of the cup washer 17 and the piston. The spring 9 acts on the front face 34 of the cup washer and abuts against the left hand wall 36 of the cylinder.

When the piston 4 in the embodiment of FIG. 3 returns from an operative position to its rest position the partial vacuum on the left hand side of the cup washer allows liquid to flow from the groove 14 through the passages 18 into the cylinder and thus avoid any impediment to the piston moving to its rest position.

Figure 4:
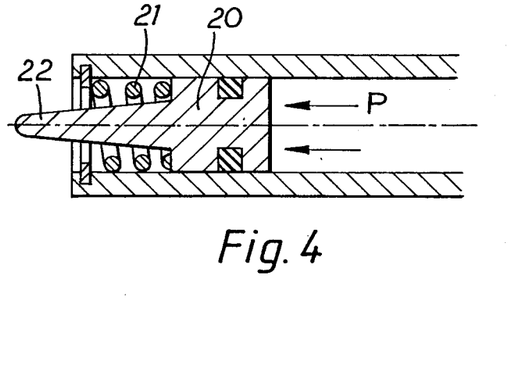
FIG. 4 is a detail view showing hydraulic actuating means for a piston.

The right hand end of the piston is provided with the recess 46 and this may receive, with reference to FIG. 4, a tappet 22 on a piston 20. The piston 20 operates in an hydraulic cylinder and is urged to the right by a spring 21. Hydraulic pressure applied to the cylinder moves the tappet 22 to the left to engage the piston 4 and apply pressure to the fluid in the interior of the coupling.

In FIGS. 2 and 3 the port means 8 is connected to a tank 11 in a similar manner to that shown in FIG. 1.

In FIG. 3 the collar 5 containing a channel 37 is located between a pair of circlips and is sealed to the hub outer surface.

Figure 5:
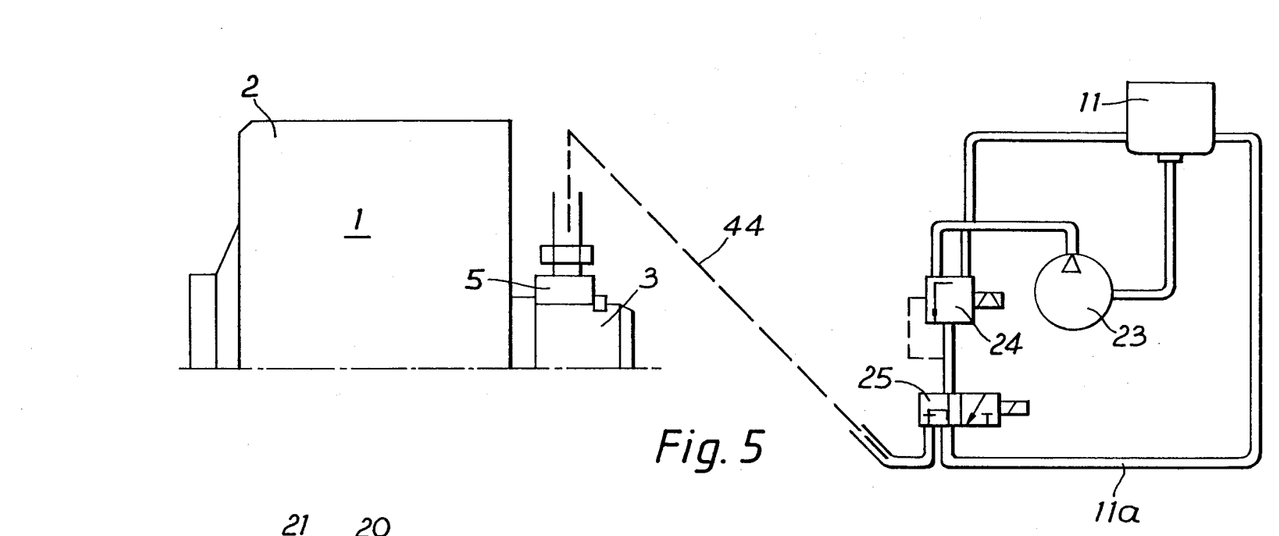
FIG. 5 illustrates a second embodiment of the invention using a hydraulic pump.

FIG. 5 shows an alternative means of applying and releasing pressure on the liquid in the interior 13 of the coupling. In this arrangement an hydraulic pump 23, preferably a rotary vane pump, withdraws liquid from a tank 11 and delivers the liquid to an adjustable pressure regulator 24. Liquid then passes to a two position control valve 25. In the position shown the line 44 is connected through the valve 25 to the return line 11a to the tank 11 so that the interior 13 of the coupling is at atmospheric pressure. If the valve 25 is moved to the left in FIG. 5 then pressure generated by the pump 23 is fed to the line 44 and thus to the cylinder and the interior 13 of the coupling is pressurised with the pressure applied to the interior 13 being determined by the pressure regulator 24. When the valve is in the position shown in FIG. 5 pressure fluid generated by the pump 23 passes back to the tank 11 through the valve 25.

Figure 7:
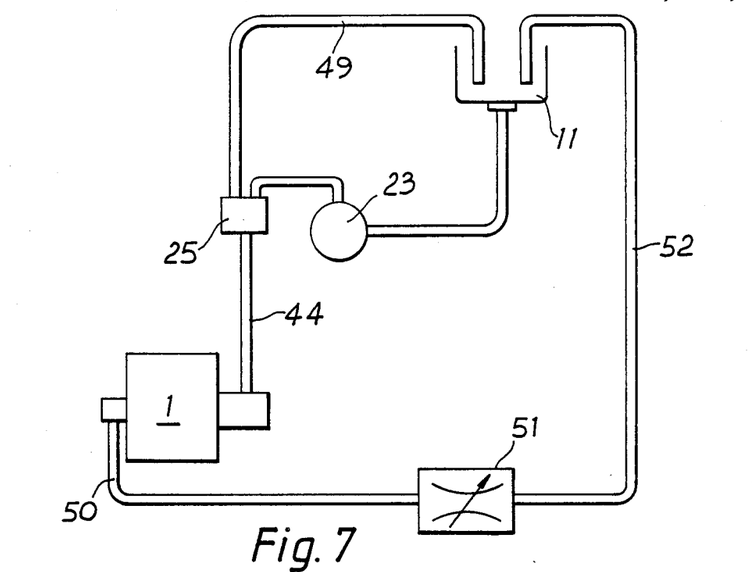
FIG. 7 is a diagram showing a third embodiment of the invention.

FIG. 7 shows another arrangement using a pump. In this case the pump 23 withdraws liquid from the tank 11 and passes it through a regulator 25. Fluid split from the regulator passes back to the tank along the line 49. Liquid from the regulator 25 passes along the line 44 to the coupling and is supplied to the interior 13 of the coupling as described above. In this arrangement, however, there is continuous circulation of liquid through the coupling and there is a return line 50 from the coupling interior 13 which passes through a variable throttle 51 along a secondary return line 52 to the tank 11. In this arrangement, the pressure regulator 25 will control the maximum pressure which may be applied to the coupling; the actual pressure in the coupling is determined by operating the throttle 51. The greater the throttling that is applied the higher will be the pressure in the coupling. This arrangement is satisfactory since it avoids any leakage problem and any tendency of the viscous liquid to generate gas in the coupling.

Figure 6:
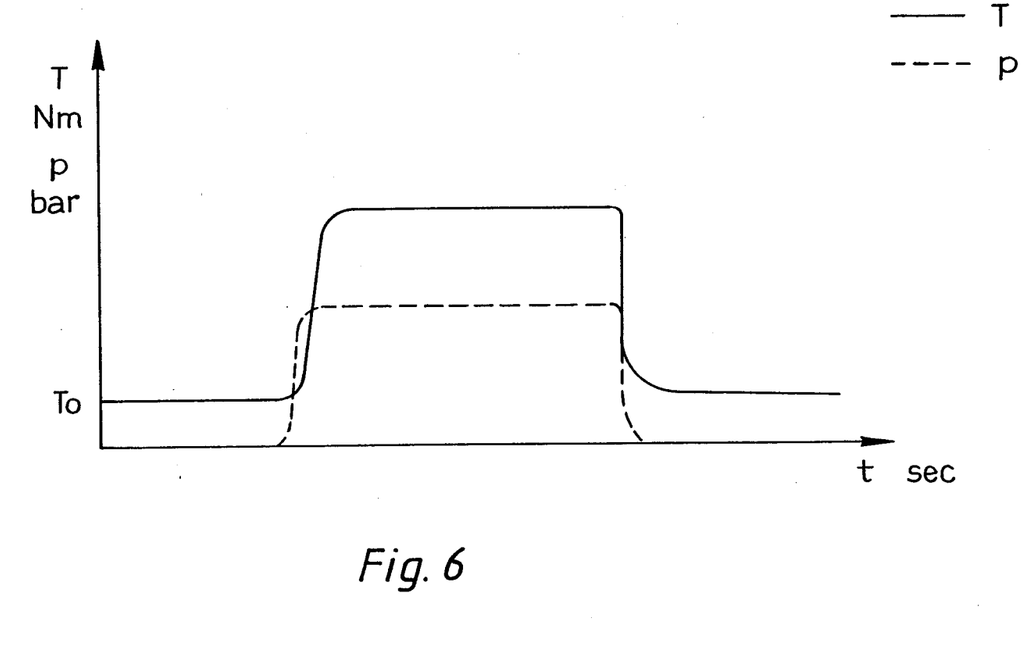
FIG. 6 shows how the transmitted torque of the coupling depends on the pressure therein.

Referring now to FIG. 6, this shows a graph of the transmitted torque and pressure in the coupling with respect to time. It assumes that, when the coupling interior 13 is exposed to low pressure, e.g. atmospheric pressure, there is a viscous torque To due to viscous sheer between the plates 12 and 26. When the piston 4 is moved to the left to apply pressure to the liquid in the interior 13 as shown by the dash line there is a very rapid increase in torque due to the plates moving into contact with one another. The torque transmitted will depend, inter alia, on the pressure in the interior of the coupling.

When the piston 4 is allowed to return to its rest position the pressure drops suddenly and it will be seen that the torque follows the pressure drop substantially instantaneously to the value To. The value of To will depend on the viscosity of the fluid in the coupling and may be as low a value as desired. It will be seen that the invention provides a coupling which can be caused to transmit torque rapidly and disconnected equally rapidly without there being any necessity to have mechanical operating means acting on the interleaved plates.

Figure 8:
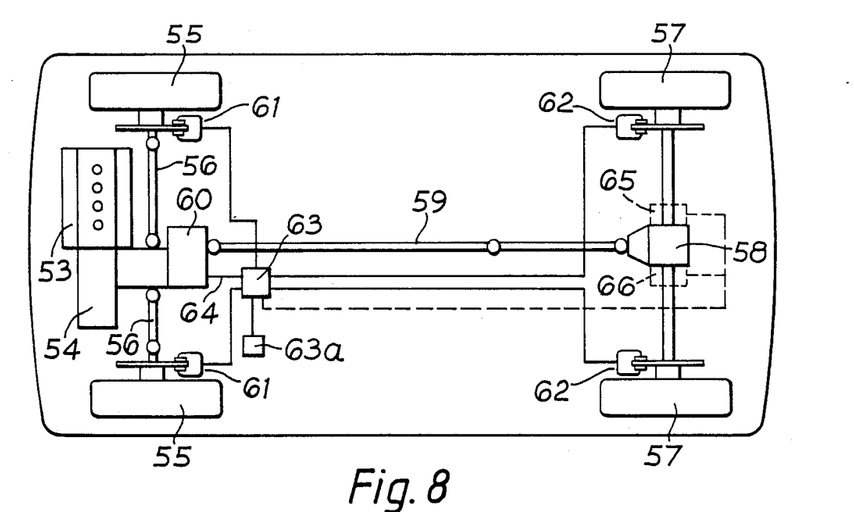
FIG. 8 is a diagram illustrating the application of a coupling of the invention to a motor vehicle.

As it mentioned above this coupling assembly has particular application to a motor vehicle and this is described in relation to FIG. 8. The vehicle has a prime mover 53 driving through a gearbox 54 a front pair of wheels 55 via drive shafts 56. A rear pair of wheels 57 is driven from a differential 58 via a propeller shaft 59 which is connected via a coupling assembly 60 embodying the invention to the gearbox 54.

The vehicle is provided with brake means 61 at the front wheels which means includes speed sensors for those wheels and brake means 62 of the rear wheels which includes speed sensors for those wheels. The brake means 61, 62 are connected to a control unit 63 which in turn is connected at 64 to the coupling assembly 60. A driver's control 63a is also connected to the control unit 63. The control 63 may be such that by its operation it applies pressure to the coupling or may enable the operation of the coupling in dependence on the speed difference between the wheels 55 and 57 as hereinafter described. Assuming that the coupling assembly is to be operated in dependence on the speed difference between the wheels 55 and 57 then normally, when there is no substantial slip between the wheels 55 and 57, drive is substantially through the wheels 55 and the coupling assembly 60 is exposed to low pressure, e.g. atmospheric pressure, so that, referring to FIG. 6, there is only a small torque To applied to the rear wheels which may be negligible and does not serve to drive them.

If the speed sensors associated with the wheels 55, 57 show that the front wheels are slipping relative to the rear wheels, the control unit 63 then operates to apply pressure to the coupling assembly 60 and thus to drive the rear wheels 57 until such time as both sets of wheels are again rotating at substantially the same speed.

If the brakes are applied by the driver of the vehicle and this brake application results in a tendency for the front wheels to lock then the control unit 63 operates to return the pressure in the coupling 60 to atomspheric if it should be higher than that so that there is no tendency for locking front wheels to also lock the rear wheels 57 thus affecting lateral stability of the vehicle.

Instead of driving the shaft 59 through a coupling such as 60, there may be a direct drive to the shaft 59 and the differential 58 will be replaced by two coupling assemblies 65 and 66 embodying the invention. These will be controlled from the control unit 63 in the same manner as the unit 60. Normally the coupling assemblies will be disconnected as described if the wheels 55 and 57 are rotating at substantially the same speed, but if slip of the front wheels 55 occurs then the coupling assemblies 65 and 66 will be engaged to provide drive to the rear wheel 57 relative to the rear wheels 57.

Figure 9:
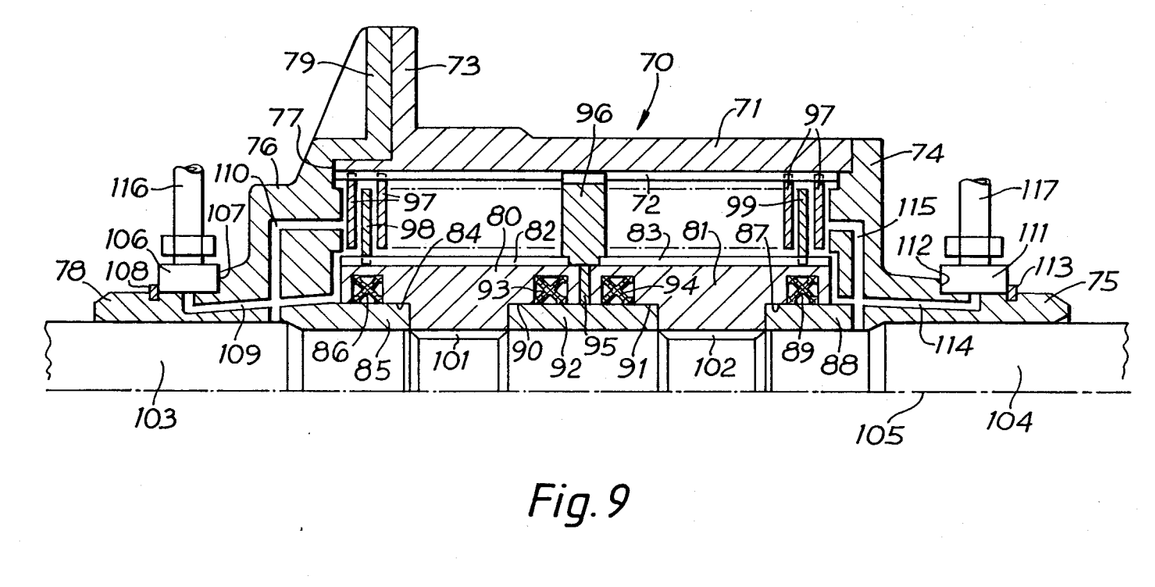
FIG. 9 is a cross-section through a further form of coupling assembly embodying the invention.

If desired the two coupling assemblies 65 and 66 may be replaced by a single coupling assembly which acts as a combined slip coupling and differential. Such a coupling assembly is shown in FIG. 9 in which reference should now be made.

The coupling comprises a housing part 70 which comprises a cylindrical wall 71 having internal splines 72 and an external flange 73. The cylindrical wall 71 is fixedly secured to an end member 74 having a hollow cylindrical extension 75. The other end of the housing is formed by a cover plate 76 which is sealed to the cylindrical wall at 77 and which has a hollow cylindrical extension 78 and a flange 79 aligned with the flange 73. The flange 73 may have bolted thereto a crown wheel, not shown, whereby the housing 70 may be driven, the crown wheel being driven by a pinion from the shaft 59.

Within the housing part are two generally annular members 80 and 81 which are externally splined at 82 and 83 respectively. The member 80 is provided with a recess 84 in which is received a cylindrical flange 85 of the end member 76, the flange 85 and the member 80 being sealed by a seal 86. In a similar manner the member 81 has a recess 87 in which is received a cylindrical flange 88 of the end member 74, the member 81 of the flange 88 being sealed by a flange 89.

At their inner ends, the members 80 and 81 are provided respectively with recesses 90 and 91 within which is received a cylindrical member 92 which is sealed to the members 80 and 81 by seals 93 and 94. A thrust member 95 is located between the adjacent ends of the members 80 and 81 and a central diaphragm 96 divides the interior of the housing into two parts which are in communication with one another so that liquid can flow from one part to another.

There is a first set of plates, some of which are indicated at 97, splined to the splines 72 of the housing part so as to rotate therewith. There is a second set of plates, one of which is shown at 98 which is splined to the splines 82 of the member 80 so as the rotate therewith, the plates 98 being interleaved with the plates 97 which are the left to the diaphragm 96. There is a third set of plates, one of which is shown at 99 which is splined to the splines 83 of the member 81. The plates 99 are interleaved with the plates 97 to the right of the diaphragm 96.

Either the plates 97 or the plates 98 and 99 are independently axially movable so that the plates 98 and 99 can come into contact with the plates 97.

The members 80 and 81 are internally splined at 101 and 102 and receive shafts 103 and 104 respectively having external splines to mate with the splines 101 and 102. The member 80 and the shaft 103 forms a first hub part and the member 81 and the shaft 134 forms a second hub apart. Each hub part extends from the housing in sealed relation thereto and the hub parts are rotatable relative to the housing about a common axis 105 and are also relatively rotatable with respect to each other about said axis.

The interior space in the housing part 70 not taken up by the plates is completely filled with a viscous liquid such as a silicone oil as described above. Means is provided for supplying pressure to the liquid in the housing part and this means is similar to that as described above.

Thus there is a collar 106 which is located on the end member 76 between a shoulder 107 and a circlip 108. This is similar to the collar 5 in FIG. 1 and contains an annular channel, not shown, which connects with aperture means which communicates with the interior of the housing part. These aperture means are constituted by two drillings 109 and 110. It will be seen that the drilling 110 opens into the interior of the housing part in a direction parallel to the common axis 105.

In a similar manner there is a collar 111 mounted on the end member 74 between a shoulder 112 and a circlip 113 and this communicates with the interior of the housing by drillings 114 and 115, the latter opening into the interior of the housing in a direction parallel to the common axis 105.

The collars 106 and 111 are connected by pipes 116 and 117 respectively to means for applying pressure to the liquid in the housing part. These means may comprise a piston or a similar cylinder assembly as shown in FIG. 1 or a pump arrangement such as shown in FIG. 5. With a suitable modification the pressuring means of FIG. 7 could also be used if there was an outlet for the liquid so that it could be continuously circulated through the housing part.

In operation, when there is only a low pressure on the liquid in the housing, for example atmospheric pressure, there will be only a low torque transfer between the housing part 70 and the shafts 103 and 104. Upon application of pressure to the pipes 116 and 117 the pressure in the coupling will increase and the plates 97 and 98 will move into engagement as will the plates 97 and 99 so that there will be a hump mode operation between the housing part 70 and each of the shafts 103 104 of the hub parts.

The coupling assembly of FIG. 9 can replace the coupling assembly 65 and 66 shown in FIG. 8 and in this case as described above the shaft 59 would drive the housing part 70 via crown wheel pinion and the shafts 103 and 104 would drive the wheels 57.

We claim:

1. A coupling assembly comprising a housing part, a hub part within the housing part and extending therefrom in sealed relation thereto, two sets of interleaved annular plates in the housing, the plates of one said sets being rotatable with the housing and the plates of the other set being rotatable with the hub part, the plates of at least one of the sets being independently and axially movable with respect to the part with which they are rotatable so as to be capable of coming into contact with the plates of the other set, a viscous liquid completely filling the housing part, aperture means communicating with the interior of the housing part and control means external of the housing part and connected to the aperture means for applying pressure to the liquid in the housing part, the control means being selectively and repeatedly operable to cause rapid increases and decreases in such applied pressure.

2. A coupling assembly comprising a housing part, first and second hub parts within the housing part and each extending therefrom in sealed relation thereto, three sets of interleaved annular plates in the housing, the plates of the first of said sets being rotatable with the housing, the plates of the second of said sets being rotatable with the first hub part and the plates of the third set being rotatable with the second hub part, the plates of the first set or the plates of the second and third sets being independently and axially movable with respect to the part with which they are rotatable so that the plates of the second and third sets are capable of coming into contact with the plates of the first set, a viscous liquid completely filling the housing part, aperture means communicating with the interior of the housing part and control means external of the housing part and connected to the aperture means for applying pressure to the liquid in the housing part, the control means being selectively and repeatedly operable to cause rapid increases and decreases in such applied pressure.

3. A coupling assembly according to claim 1 wherein the control means includes a cylinder connected to the aperture means and full of liquid, a piston movable axially of the cylinder and operating means to move the piston and the cylinder to increase and decrease the pressure applied to the liquid in the cylinder and housing.

4. A coupling assembly according to claim 3 wherein the piston is spring urged to a rest position in which the liquid in the cylinder and thus in the housing is exposed to a low pressure.

5. A coupling assembly according to claim 4 including a tank containing liquid which is exposed to said low pressure, the tank being connected to port means in the cylinder wall, the port means being open when the piston is in its rest position but being closed by the piston when the latter is in an operative position in which it applies pressure to the liquid in the cylinder and the housing, the tank being arranged to maintain the cylinder full of liquid when the port means is open.

6. A coupling assembly according to claim 4 wherein the piston includes an annular groove which is connected to the port means when the piston is in its operative position, the groove being connected to the cylinder via non-return means in the piston which allows liquid in the groove to enter the cylinder when the piston moves from an operating position to its rest position.

7. A coupling assembly according to claim 3 wherein the cylinder is arranged within the hub part with the longitudinal axis of the cylinder being coincident with said common axis.

8. A coupling assembly according to claim 3 wherein the operating means for the piston is hydraulic.

9. A coupling assembly according to any preceding claim wherein the aperture means opens into the housing part generally radially thereof and approximately mid-way between the ends thereof.

10. A coupling assembly according to claim 1 wherein the aperture means opens into the housing part generally axially thereof.

11. A coupling assembly according to claim 1 wherein the control means comprises a hydraulic pump to supply liquid under pressure to the housing part and a pressure controller operable to cause said rapid increase and decrease in pressure of the liquid in the housing part.

12. A coupling assembly according to claim 11 wherein the pump continuously circulates viscous liquid through the housing part via feed and return lines and wherein the pressure controller includes a variable throttle in the return line.

13. A coupling assembly according to claim 11 wherein the pressure controller includes a pressure regulator in the feed line between the pump and the housing part to control the pressure applied to the liquid in the housing part and a control valve operable selectively to connect the housing part to the pressure regulator or to a low pressure.

14. A coupling assembly according to claim 1 wherein said control means is arranged to increase said applied pressure from, and reduce said applied pressure substantially to, atmospheric pressure.

15. A motor vehicle comprising a prime mover and front and rear axles, one of said axles being driven directly from the prime mover and the other axle being driven from the prime mover via a coupling assembly as claimed in claim 1, the vehicle including actuating means to actuate the control means to increase and decrease the pressure applied to the liquid in the housing part.

16. A motor vehicle according to claim 15 wherein the actuating means is operable, at least in part, by the driver of the vehicle.

17. A motor vehicle according to claim 15 wherein the actuating means is operable at least in part in dependence upon the speed difference between the housing part and one or both of the hub parts.

18. A coupling assembly according to claim 17 wherein the pressure applied to the coupling is a function of said speed difference and increases with increasing speed difference.

19. A motor vehicle according to claim 15 including a braking system, particularly an anti-lock braking system, and wherein the actuating means operates on the control means to ensure that said other axle is not connected to the prime mover on application of the vehicle brakes.

* * * * *

UNITED STATES PATENT AND TRADEMARK OFFICE
CERTIFICATE OF CORRECTION

PATENT NO. : 4,846,299

DATED : July 11, 1989

INVENTOR(S) : Helmut Wiese et al

It is certified that error appears in the above-identified patent and that said Letters Patent is hereby corrected as shown below:

In the heading of the Patent, it should read:

[30]     Foreign Application Priority Data

January 23, 1987 [DE] Fed. Rep. of Germany ...... 3701884

Signed and Sealed this

Fifteenth Day of May, 1990

Attest:

HARRY F. MANBECK, JR.

*Attesting Officer*     *Commissioner of Patents and Trademarks*